United States Patent
Ganzel

(10) Patent No.: US 11,904,819 B2
(45) Date of Patent: Feb. 20, 2024

(54) VEHICLE BRAKE SYSTEM

(71) Applicant: ZF Active Safety US Inc., Livonia, MI (US)

(72) Inventor: Blaise Ganzel, Ann Arbor, MI (US)

(73) Assignee: ZF Active Safety US. Inc., Livonia, MI (US)

( * ) Notice: Subject to any disclaimer, the term of this patent is extended or adjusted under 35 U.S.C. 154(b) by 209 days.

(21) Appl. No.: 16/801,232

(22) Filed: Feb. 26, 2020

(65) Prior Publication Data
US 2021/0261109 A1  Aug. 26, 2021

(51) Int. Cl.
| | | |
|---|---|---|
| B60T 13/14 | (2006.01) | |
| B60T 17/04 | (2006.01) | |
| B60T 17/06 | (2006.01) | |
| B60T 17/22 | (2006.01) | |
| B60T 7/04 | (2006.01) | |
| B60T 8/40 | (2006.01) | |

(52) U.S. Cl.
CPC ............ B60T 13/142 (2013.01); B60T 7/042 (2013.01); B60T 8/4072 (2013.01); B60T 17/04 (2013.01); B60T 17/06 (2013.01); B60T 17/227 (2013.01); *B60T 2270/40* (2013.01)

(58) Field of Classification Search
CPC ...... B60T 7/042; B60T 8/4072; B60T 8/4077; B60T 8/4081; B60T 13/142; B60T 13/148; B60T 13/161; B60T 13/168; B60T 17/227
See application file for complete search history.

(56) References Cited

U.S. PATENT DOCUMENTS

| | | | | |
|---|---|---|---|---|
| 1,604,545 | A | * 10/1926 | Bragg ..................... | B60T 13/16 12/142 Q |
| 3,917,358 | A | * 11/1975 | Takeuchi ............ | B60T 8/17613 303/193 |
| 4,919,495 | A | * 4/1990 | Kircher ................... | B60T 8/445 188/152 |

(Continued)

FOREIGN PATENT DOCUMENTS

| | | | | |
|---|---|---|---|---|
| DE | 4031533 A1 | * | 4/1992 | ............ B60T 8/4872 |
| DE | 4226646 A1 | * | 2/1994 | .............. B60T 8/175 |

(Continued)

*Primary Examiner* — Thomas J Williams
(74) *Attorney, Agent, or Firm* — Robert James Harwood

(57) ABSTRACT

A brake system with a wheel brake has a fluid reservoir and a valve assembly in fluid communication with the reservoir via a first conduit. The valve assembly is in fluid communication with the wheel brake via a second conduit. The valve assembly includes a bypass valve which only permits fluid flow from the first conduit to the second conduit when the fluid pressure within the first conduit is above a predetermined pressure level above atmospheric pressure. The valve assembly further includes a check valve in a parallel path arrangement relative to the bypass valve such that the check valve permits fluid flow from the second conduit to the first conduit, and prevents fluid flow from the first conduit to the second conduit. The brake system further includes a first source of pressurized fluid providing fluid pressure for actuating the wheel brake, wherein the first source of pressurized fluid is selectively in fluid communication with the second conduit.

16 Claims, 6 Drawing Sheets

(56) References Cited

U.S. PATENT DOCUMENTS

| | | | | |
|---|---|---|---|---|
| 5,195,810 | A * | 3/1993 | Ocvirk | B60T 8/4291 |
| | | | | 303/11 |
| 5,501,514 | A * | 3/1996 | Resch | B60T 8/5037 |
| | | | | 303/DIG. 2 |
| 5,722,744 | A * | 3/1998 | Kupfer | B60T 7/042 |
| | | | | 303/10 |
| 5,947,567 | A * | 9/1999 | Jonner | B60T 8/4031 |
| | | | | 303/115.4 |
| 6,079,796 | A * | 6/2000 | Schmidt | B60T 8/348 |
| | | | | 303/116.1 |
| 6,220,675 | B1 * | 4/2001 | Steffes | B60T 8/4275 |
| | | | | 303/116.2 |
| 6,290,306 | B1 * | 9/2001 | Friedow | B60T 8/34 |
| | | | | 303/116.1 |
| 6,402,265 | B1 * | 6/2002 | Hachtel | B60T 7/042 |
| | | | | 303/113.4 |
| 6,648,423 | B1 * | 11/2003 | Klein | B60T 7/12 |
| | | | | 180/170 |
| 2012/0326493 | A1 * | 12/2012 | Okamura | B60T 13/686 |
| | | | | 303/10 |
| 2014/0354036 | A1 * | 12/2014 | Koo | B60T 13/745 |
| | | | | 303/6.01 |
| 2021/0261109 | A1 * | 8/2021 | Ganzel | B60T 13/146 |

FOREIGN PATENT DOCUMENTS

| | | | | |
|---|---|---|---|---|
| DE | 102008060622 A1 * | 4/2010 | | B60T 13/686 |
| GB | 731711 A * | 6/1955 | | B60T 11/22 |

* cited by examiner

VEHICLE BRAKE SYSTEM

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster generates pressurized fluid for assisting in pressurizing the wheel brakes, thereby increasing the pressures generated by the master cylinder.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control. Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Various braking systems have been developed to handle these complex braking maneuvers such as ABS, TC, and VSC. Some of these modern brake systems may include a plunger assembly having a linear actuator which controls a piston to pressurize a fluid chamber for providing a source of pressurized fluid to the brake system. The linear actuator can be rapidly controlled to provide the pressure forces necessary to actuate the wheel brakes. It is desirable to provide such a brake system which is cost effective while providing for sufficient back up features in case of failure scenarios of various components of the brake system.

SUMMARY OF THE INVENTION

The invention relates to vehicle brake system having a wheel brake and a fluid reservoir associated therewith. A valve assembly is in fluid communication with the reservoir via a first conduit. The valve assembly is in fluid communication with the wheel brake via a second conduit. The valve assembly includes a bypass valve which only permits fluid flow from the first conduit to the second conduit when the fluid pressure within the first conduit is above a predetermined pressure level above atmospheric pressure. The valve assembly further includes a check valve in a parallel path arrangement relative to the bypass valve such that the check valve permits fluid flow from the second conduit to the first conduit, and prevents fluid flow from the first conduit to the second conduit. The brake system further includes a first source of pressurized fluid providing fluid pressure for actuating the wheel brake, wherein the first source of pressurized fluid is selectively in fluid communication with the second conduit.

The invention also relates to a brake system having a wheel brake and being operable under a non-failure normal braking mode and a manual push-through mode. The brake system includes a first source of pressurized fluid providing fluid pressure for actuating the wheel brake under a normal braking mode. The brake system further includes a master cylinder operable by a brake pedal during a manual push-through mode to provide fluid flow at an output for actuating the wheel brake. The master cylinder has a single fluid pressure chamber pressurized by movement of a single piston slidably disposed in a bore of a housing of the master cylinder.

The invention also relates to a master cylinder including a housing having a bore formed therein defining a pressure chamber. A single piston is slidably mounted within the bore, wherein movement of the single piston pressurizes the pressure chamber of the master cylinder. A spring assembly biases the piston. The spring assembly includes first and second springs and a retainer disposed between the first and second springs. The retainer is slidably disposed within the bore of the housing.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
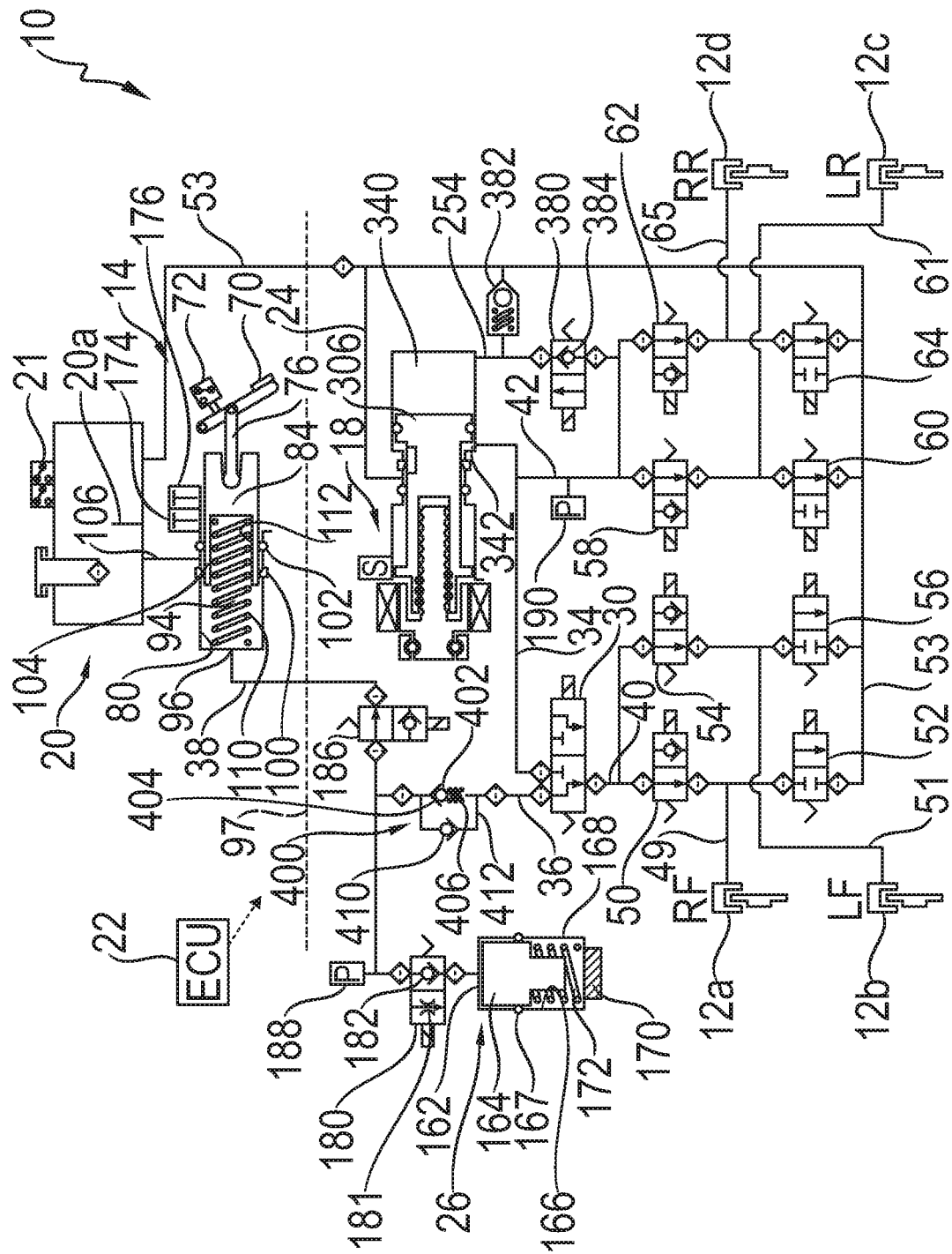
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12a, 12b, 12c, and 12d. The wheel brakes 12a, 12b, 12c, and 12d can have any suitable wheel brake structure operated by the application of pressurized brake fluid. The wheel brakes 12a, 12b, 12c, and 12d may include, for example, a brake caliper mounted on the vehicle to engage a frictional element (such as a brake disc) that rotates with a vehicle wheel to effect braking of the associated vehicle wheel. The wheel brakes 12a, 12b, 12c, and 12d can be associated with any combination of front and rear wheels of the vehicle in which the brake system 10 is installed. A vertically split brake system is illustrated such that the wheel brake 12a is associated with the right front wheel, the wheel brake 12b is associated with the left front wheel, the wheel brake 12c is associated with the left rear wheel, and the wheel brake 12d is associated with the right rear wheel.

The brake system 10 includes a master cylinder, indicated generally at 14, a pedal simulator, indicated generally at 16, a plunger assembly, indicated generally at 18, and a fluid reservoir, indicated generally at 20. The reservoir 20 functions as a tank to store and hold hydraulic fluid for the brake system 10. The fluid within the reservoir 20 is preferably held at or about atmospheric pressure but may store the fluid at other pressures if so desired. As will be discussed in detail below, the reservoir 20 may include one or more fluid level sensors 21 for detecting the fluid level within the reservoir 20. The reservoir 20 may also include an internal separator wall 20a partially extending upwardly from the bottom floor of the reservoir 20. The separator wall 20a extends all the way from one side wall of the reservoir 20 to the other opposed side wall of the reservoir 20 to generally define two separate fluid chambers at the lower portion of the reservoir 20.

As will also be discussed in detail below, the plunger assembly 18 of the brake system 10 functions as a source of pressure to provide a desired pressure level to the wheel brakes 12a, 12b, 12c, and 12d during a typical or normal brake apply. Fluid from the wheel brakes 12a, 12b, 12c, and 12d may be returned to the plunger assembly 18 and/or diverted to the reservoir 20.

The brake system 10 includes an electronic control unit (ECU) 22. The ECU 22 may include microprocessors. The ECU 22 receives various signals, processes signals, and controls the operation of various electrical components of the brake system 10 in response to the received signals. The ECU 22 can be connected to various sensors such as pressure sensors, travel sensors, switches, wheel speed sensors, and steering angle sensors. The ECU 22 may also be connected to an external module (not shown) for receiving information related to yaw rate, lateral acceleration, longitudinal acceleration of the vehicle such as for controlling the brake system 10 during vehicle stability operation. Additionally, the ECU 22 may be connected to the instrument cluster for collecting and supplying information related to warning indicators such as an ABS warning light, a brake fluid level warning light, and a traction control/vehicle stability control indicator light.

The brake system 10 further includes an isolation valve 30. The isolation valve 30 may be a solenoid actuated three-way valve. The isolation valve 30 is generally operable to two positions, as schematically shown in FIG. 1. The isolation valve 30 has a port in selective fluid communication with an output conduit 34 generally in communication with an output of the plunger assembly 18, as will be discussed below. The isolation valve 30 also includes a port that is selectively in fluid communication with a conduit 36 when the isolation valve 30 is de-energized, as shown in FIG. 1. The conduit 36 is in selective fluid communication with a conduit 38 connected to the output of the master cylinder 14. The isolation valve 30 further includes a port that is in fluid communication with a conduit 40 which provides fluid to and from the wheel brakes 12a and 12b.

In a preferred embodiment, the isolation valve 30 may be mechanically designed such that flow is permitted to flow in the reverse direction (from the conduit 34 to the conduits 36 and 40, respectively) when in their de-energized positions and can bypass the normally closed seat of the valve 30. Thus, although the 3-way valve 30 is not shown schematically to indicate this fluid flow position, it is noted that that the valve design may permit such fluid flow. This may be helpful in performing self-diagnostic tests of the brake system 10.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the isolation valve 30 to the wheel brake 12a via a conduit 49, and for cooperatively relieving pressurized fluid from the wheel brake 12a to a reservoir conduit 53 in fluid communication with the reservoir 20. A second set of valves includes a second apply valve 54 and a second dump valve 56 in fluid communication with the conduit 40 for cooperatively supplying fluid received from the isolation valve 30 to the wheel brake 12b via a conduit 51, and for cooperatively relieving pressurized fluid from the wheel brake 12b to the reservoir conduit 53. A third set of valves includes a third apply valve 58 and a third dump valve 60 in fluid communication with a conduit 42 (in fluid communication with the conduit 34) for cooperatively supplying fluid received from the plunger assembly 18 to the wheel brake 12c via a conduit 61, and for cooperatively relieving pressurized fluid from the wheel brake 12c to the reservoir conduit 53. A fourth set of valves includes a fourth apply valve 62 and a fourth dump valve 64 in fluid communication with the conduit 42 for cooperatively supplying fluid received from the plunger assembly 18 to the wheel brake 12d via a conduit 65, and for cooperatively relieving pressurized fluid from the wheel brake 12d to the reservoir conduit 53. Note that in a normal braking event, fluid flows through the non-energized open apply valves 50, 54, 58, and 62. Additionally, the dump valves 52 and 56 are preferably in their de-energized closed positions to prevent the flow of fluid to the reservoir 20. However, in a preferred embodiment, the dump valves 60 and 64 are preferably normally open solenoid actuated valves, the reasons for which will be explained in detail below. It should be understood that the dump valves 60 and 64 could be designed as normally closed valves to function in a similar manner as the normally closed valves 52 and 56.

The master cylinder 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, the master cylinder 14 may be used as a back-up source of pressurized fluid to essentially replace the normally supplied source of pressurized fluid from the plunger assembly 18 under certain failed conditions of the brake system 10. In this situation, the master cylinder 14 supplies pressurized fluid in the conduit 40 (that is normally closed off at the isolation valve 30 during a normal brake apply) to the wheel brakes 12a and 12b.

As schematically shown in FIG. 1, the master cylinder 14 includes a housing having a bore 80 formed therein for slidably receiving a cylindrical piston 84 slidably disposed within the bore 80. Note that the housing is not specifically schematically shown in FIG. 1 but instead the walls of the bore 80 are illustrated. The housing may be formed as a single unit or include two or more separately formed portions coupled together. The piston 84 is connected with the brake pedal 70 via a linkage arm 76. Leftward movement of the piston 84 may cause, under certain conditions, a pressure increase within a pressure chamber 94 of the master cylinder 14. Note that unlike some conventional brake systems that use a tandem type of master cylinder for pressurizing two fluid chambers, the master cylinder 14 is of a single chamber design which pressurizes only a single pressure chamber 94 therein. The reasons and advantages of this utilization of a single chamber master cylinder will be explained in detail below. Various seals of the master cylinder 14 as well as the structure of the housing and the piston 84 define the chamber 94. For example, the pressure chamber 94 is generally defined between the piston 84 and an end wall of the bore.

The pressure chamber 94 of the master cylinder 14 is in fluid communication with the isolation valve 30 via the conduits 38 and 36. An outer wall of the piston 84 is engaged with a recuperating or lip seal 100 and a seal 102 mounted in grooves formed in the housing. One or more lateral passageways 104 are formed through a wall of the piston 84. The passageway 104 is located between the lip seal 100 and the seal 102 when the piston 84 is in its rest position, as shown in FIG. 1. Note that in the rest position the lip seal 100 is just slightly to the left of the passageway 104, thereby permitting fluid communication between the chamber 94 and the reservoir 20 via a conduit 106. As will be discussed below, when the passageway 104 moves past the lip seal 100 such that it is to the left of the lip seal 100, fluid communication is cut off between the chamber 94 and the reservoir 20. Therefore, the cooperation between the passageway 104, the lip seal 100, and the conduit 106 function as a compensation port selectively permitting fluid communication between the chamber 94 and the reservoir 20.

The master cylinder 14 may include a spring 110 disposed within a bore 112 formed in piston 84. The spring 110 extends from the bottom of the bore 112 of the piston 84 and the end wall of the bore 80 of the housing of the master cylinder 14. The spring 110 biases the piston 84 in a direction towards the brake pedal 70. The spring 110 may be a single coil spring, as shown, or may be include an assembly of parts such as a caged spring assembly. Housing the spring 84 within the bore 112 formed in the piston 84 also helps in reducing the overall length of the master cylinder 14.

The pressure chamber 94 of the master cylinder 14 is in selective fluid communication with the pedal simulator 16 via the conduit 38 at a port 96 of the master cylinder 14. As will be discussed below, leftward movement of the piston 84 caused by the driver depressing the brake pedal 70 will pressurize the chamber 94 causing fluid to flow into the pedal simulator 16 via the conduit 38. The pedal simulator 16 can be any suitable structure which provides a feedback force to the driver's foot via the brake pedal 70 when depressed. The pedal simulator 16 may include movable components which mimic the feedback force from a conventional vacuum assist hydraulic brake system. For example, as fluid is diverted into the pedal simulator 16, a simulation pressure chamber 162 defined within the pedal simulator 16 will expand causing movement of a piston 164 within the pedal simulator 16. Note that in FIG. 1 when the pedal simulator 16 is shown in its at rest phase, the chamber 162 is schematically shown nearly collapsed. The piston 164 is slidably disposed in a bore 166 formed in a housing of the pedal simulator 16. The piston 164 is sealingly engaged with the wall of the bore 166 by a seal 167. Movement of the piston 164 compresses a spring assembly, schematically represented as a spring 168. The compression of the spring 168 provides the feedback force to the driver of the vehicle. The spring 168 of the pedal simulator 16 can include any number and types of spring members as desired. For example, the spring 168 may include a combination of low rate and high rate spring elements to provide a non-linear force feedback. The pedal simulator 16 may also include an elastomeric pad 170 which engages with an end of the piston 164 when the piston 164 approaches its end of travel position, thereby providing a desired feedback force different from that provided solely by the spring 166. The spring 166 of the pedal simulator 16 may be housed within an air-filled chamber 172 vented to atmosphere. Alternatively, the spring 166 may be housed in a non-pressurized fluid chamber which may optionally be in fluid communication with the reservoir 20.

The brake system 10 further includes a solenoid actuated simulator valve 180 positioned within the conduit 38 between the chamber 94 of the master cylinder 14 and the pedal simulator 16. The simulator valve 180 selectively prevents the flow of fluid from the chamber 94 of the master cylinder 14 to the simulation chamber 162 of the pedal simulator 16, such as during a failed condition in which the master cylinder 14 is utilized to provide a source of pressurized fluid to the wheel brakes. The simulator valve 180 is preferably a normally closed solenoid actuated valve, as schematically shown in FIG. 1.

An optional restricted orifice 181 may be incorporated into the simulator valve 180, as illustrated in FIG. 1. The restricted orifice 181 provides damping during a spike apply in which the driver depresses the brake pedal 70 rapidly and forcefully. This damping provides a force feedback making depression of the brake pedal 70 feel more like a traditional vacuum booster, which may be a desirable characteristic of the brake system 10. The damping may also provide a more accurate relationship between brake pedal travel and vehicle deceleration by generally avoiding too much brake pedal travel for the vehicle deceleration that can be delivered by the brake system 10. A check valve 182 can provide an easy flow path and allows the brake pedal 70 to return quickly.

As discussed above, the chamber 94 of the master cylinder 14 is selectively in fluid communication with the reservoir 20 via a conduit 106 and the passageway 104 formed in the primary piston 84. The brake system 10 may optionally include a simulator test valve 186 located within the conduit 38. The simulator test valve 186 may be electronically controlled between an open position, as shown in FIG. 1, and an energized closed position. The simulator test valve 186 is not necessarily needed during a normal boosted brake apply or for a manual push-through mode. The simulator test valve 186 can be energized to a closed position during various testing modes to determine the correct operation of other components of the brake system 10. For example, the simulator test valve 186 may be energized to a closed position to prevent venting to the reservoir 20 via the conduits 38 and 106 to monitor fluid flow to determine whether leaks may be occurring through seals of various components of the brake system 10. The simulator test valve 186 is controlled by the ECU 22.

The brake system 10 may further include a pressure sensor 188 in fluid communication with the conduit 38 to detect the pressure from the chamber 96 of the master cylinder 14 and for transmitting the signal indicative of the pressure to the ECU 22. The brake system 10 may further include a pressure sensor 190 in fluid communication with the conduit 34 for transmitting a signal indicative of the pressure within the conduit 34 at the output of the plunger assembly 18 and for transmitting the signal indicative of the pressure to the main ECU 22.

Figure 2:
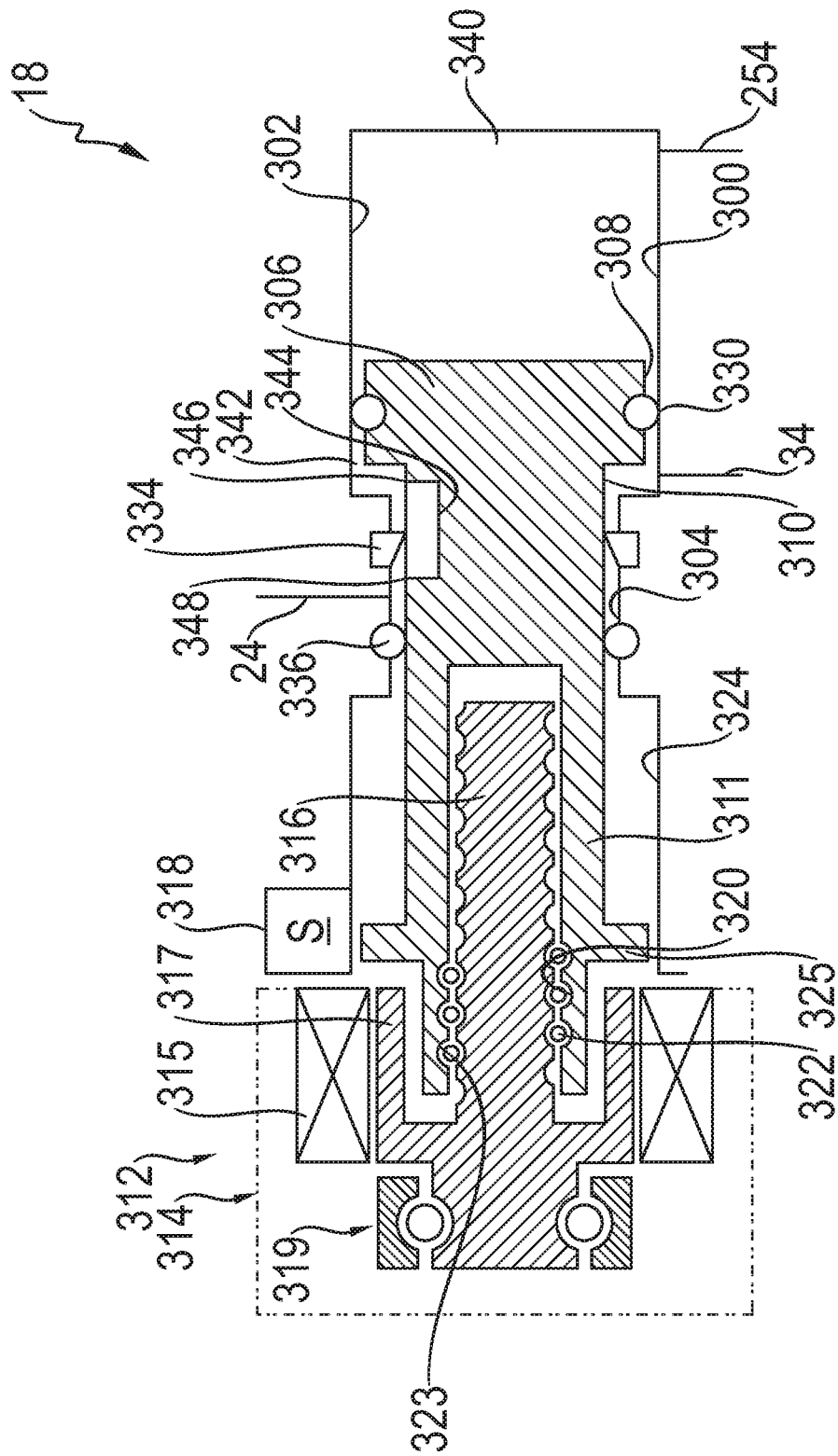
FIG. 2 is an enlarged schematic cross-sectional illustration of the plunger assembly of the brake system of FIG. 1.

Referring now to the enlarged view of the plunger assembly 18 in FIG. 2, the plunger assembly 18 includes a housing having a multi-stepped bore 300 formed therein. Note that the housing is not specifically schematically shown in FIGS. 1 and 2 but instead the walls of the bore 300 are illustrated. The bore 300 includes a first portion 302 and a second portion 304. A piston 306 is slidably disposed within the bore 300. The piston 306 includes an enlarged end portion 308 connected to a smaller diameter central portion 310. The piston 306 has a second end 311 connected to a ball screw mechanism, indicated generally at 312. The ball screw mechanism 312 is provided to impart translational or linear motion of the piston 306 along an axis defined by the bore 300 in both a forward direction (rightward as viewing FIGS. 1 and 2), and a rearward direction (leftward as viewing FIGS. 1 and 2) within the bore 300 of the housing.

In the embodiment shown, the ball screw mechanism 312 includes a motor, indicated schematically and generally at 314, which is electrically connected to the ECU 22 for actuation thereof. The motor 314 rotatably drives a screw shaft 316. The motor 314 generally includes a stator 315 and a rotor 317. In the schematic embodiment shown in FIG. 2, the rotor 317 and the screw shaft 316 are integrally formed together. However, it should be understood that they can be formed from separate parts fixedly connected together. The rotor 317 and the screw shaft 316 are rotatably mounted to the housing of the plunger assembly 18 by a bearing assembly, indicated generally at 319. The second end 311 of the piston 306 includes a threaded bore 320 and functions as a driven nut of the ball screw mechanism 312. The ball screw mechanism 312 includes a plurality of balls 322 that are retained within helical raceways 323 formed in the screw shaft 316 and the threaded bore 320 of the piston 306 to reduce friction. Although a ball screw mechanism 312 is shown and described with respect to the plunger assembly 18, it should be understood that other suitable mechanical linear actuators may be used for imparting movement of the piston 306. It should also be understood that although the piston 306 functions as the nut of the ball screw mechanism 312, the piston 306 could be configured to function as a screw shaft of the ball screw mechanism 312.

The piston 306 may include structures engaged with cooperating structures formed in the housing of the plunger assembly 18 to prevent rotation of the piston 306 as the screw shaft 316 rotates relative to the piston 306. For example, the piston 306 may include outwardly extending splines or tabs or splines 325 disposed within longitudinal grooves 324 formed in the housing. The splines 325 slide along within the grooves 324 as the piston 306 travels in the bore 300.

As will be discussed below, the plunger assembly 18 is preferably configured to provide pressure to the conduit 34 when the piston 306 is moved in both the forward and rearward directions. The plunger assembly 18 includes a seal 330 mounted on the enlarged end portion 308 of the piston 306. The seal 330 slidably engages with the inner cylindrical surface of the first portion 302 of the bore 300 as the piston 306 moves within the bore 300. A seal 334 and a seal 336 are mounted in grooves formed in the second portion 304 of the bore 300. The seals 334 and 336 slidably engage with the outer cylindrical surface of the central portion 310 of the piston 306. A first pressure chamber 340 is generally defined by the first portion 302 of the bore 300, the enlarged end portion 308 of the piston 306, and the seal 330. The first pressure chamber 340 is in fluid communication with a conduit 254 which is selectively in fluid communication with the output conduit 34, as will be explained below. An annular shaped second pressure chamber 342, located generally behind the enlarged end portion 308 of the piston 306, is generally defined by the first and second portions 302 and 304 of the bore 300, the seals 330 and 334, and the central portion 310 of the piston 306. The seals 330, 334, and 336 can have any suitable seal structure. The second pressure chamber 342 is in fluid communication with the output conduit 34.

Although the plunger assembly 18 may be configured to any suitable size and arrangement, in one embodiment, the effective hydraulic area of the first pressure chamber 340 is greater than the effective hydraulic area of the annular shaped second pressure chamber 342. The first pressure chamber 340 generally has an effective hydraulic area corresponding to the diameter of the central portion 310 of the piston 306 (the inner diameter of the seal 334) since fluid is diverted through the conduits 254 and 34 as the piston 306 is advanced in the forward direction. The second pressure chamber 342 generally has an effective hydraulic area corresponding to the diameter of the first portion 302 of the bore 300 minus the diameter of the central portion 310 of the piston 306 if the plunger valve 380 is closed. If desired, the plunger assembly 18 could be configured to provide that on the back stroke in which the piston 306 is moving rearwardly, less torque (or power) is required by the motor 314 to maintain the same pressure as in its forward stroke. Of course, it may also be desirable to configure the plunger assembly 18 such that the behavior of the rearward stroke is the same or similar to the forward stroke of the plunger assembly 18.

The plunger assembly 18 preferably includes a sensor, schematically shown as 318, for indirectly detecting the position of the piston 306 within the bore 300. The sensor 318 is in communication with the ECU 22. In one embodiment, the sensor 318 detects the rotational position of the rotor 317 which may have metallic or magnetic elements embedded therein. Since the rotor 317 is schematically shown as being integrally formed with the shaft 316, the rotational position of the shaft 316 corresponds to the linear position of the piston 306. Thus, the position of the piston 306 can be determined by sensing the rotational position of the rotor 317 via the sensor 318. Note that due to ease of manufacturing, the rotor 317 may not be integrally formed with the shaft 316 but rather may be a separate part connected to the shaft 316.

As best shown in FIG. 2, the piston 306 of the plunger assembly 18 includes a passageway 344 formed therein. The passageway 344 defines a first port 346 extending through the outer cylindrical wall of the piston 306 and is in fluid communication with the secondary chamber 342. The passageway 344 also defines a second port 348 extending through the outer cylindrical wall of the piston 306 and is in fluid communication with a portion of the bore 300 located between the seals 334 and 336. The second port 348 is in fluid communication with a conduit 24 which is in fluid communication with the reservoir 20. When in the rest position, as shown in FIG. 2, the pressure chamber 342 is in fluid communication with the reservoir 20 via the conduit 24. This helps in ensuring a proper release of pressure at the output of the plunger assembly 18 and within the pressure chambers 340 and 342 themselves. After an initial forward movement of the piston 306 from its rest position, the port 348 will move past the lip seal 334, thereby closing off fluid communication of the pressure chambers 340 and 342 from the reservoir 20, thereby permitting the pressure chambers 340 and 342 to build up pressure as the piston 306 moves further.

Referring back to FIG. 1, the brake system 10 further includes a normally closed solenoid actuated plunger valve 380. The plunger valve 380 is in fluid communication with the first pressure chamber 340 of the plunger assembly 18 via the conduit 254. The plunger valve 380 is also in fluid communication with the output conduit 34 of the plunger assembly 18 via the conduit 42. A check valve 382 is disposed between the conduit 254 and the reservoir 20 via the conduit 53. Generally, the plunger valve 380 is controlled to permit fluid flow at the outputs of the plunger assembly 18 and to permit venting to the reservoir 20 through the plunger assembly 18 when so desired. For example, the plunger valve 380 may be energized to its open position during a normal braking event and the plunger assembly 18 is operated in its forward pressure stroke. When the driver releases the brake pedal 70, the plunger valve 380 preferably remains in its open position. Alternatively, the plunger valve 380 could remain in its closed position due to a check valve 384 which functions within the valve 380 to permit the flow of fluid from the conduit 254 to the conduit conduits 42 and 34. As will be explained in further detail below, the plunger assembly 18 can be operated to provide pressure to the conduit 34 from the second pressure chamber 342 in a rearward (leftward as viewing FIGS. 1 and 2) stroke of the piston 306 as well.

Instead of using a single plunger valve 380, the brake system 10 could be configured to utilize a pair of solenoid actuated plunger valves (not shown) located at the output of the plunger assembly 18. For example, a first plunger valve may be a normally closed valve and a second plunger valve may be a normally open valve such that both valves are controlled to their open positions during a forward stroke of the piston 306. The first and second plunger valves can be operated to their closed positions during a rearward stroke of the piston 306. The first plunger valve may have a relatively large orifice when in its open position to provide an easy flow path therethrough. The second plunger valve may be provided with a much smaller orifice in its open position as compared to the first plunger valve. One reason for this is to help prevent the piston 306 of the plunger assembly 18 from rapidly being back driven upon a failed event due to the rushing of fluid through the conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 306 of the plunger assembly 18 upon failure of the brake system 10, such as for example, when power is lost to the motor 314 and the pressure within the conduit 34 is relatively high.

The brake system 10 further includes a valve assembly or bypass valve, indicated schematically at 400. The bypass valve 400 can have any suitable valve structure. For example, the bypass valve 400 may include a structure such as a spring loaded check valve design including a ball 402 and cooperating valve seat 404. The ball 402 is biased against the valve seat 404 by a spring 406. Note that the arrangement of the ball 402 and valve seat 404 prevents the flow of fluid within the conduit 36 in the direction from the isolation valve 30 to the master cylinder 14 (and possibly the reservoir 20 via the passageway 104 and the conduit 106 depending on the position of the piston 84). However, the bypass valve 400 (valve assembly) preferably includes an additional check valve 410 in a parallel arrangement with the valve seat 404 via a conduit 412 such that fluid may be diverted and free to flow in the conduit 412 in the direction from the isolation valve 30 to the master cylinder 14. The flow of fluid from the master cylinder 14 to the isolation valve 30 is restricted by the check valve 410 through the conduit 412. The flow of fluid through the conduit 312 is useful to permit any build up of pressure in the wheel brakes 12a-b to vent to the reservoir 20 after a braking event is over. The spring 406 of the bypass valve 400 only permits the flow of fluid in the opposite direction from the conduit 38 to the conduit 36 upon a sufficient fluid pressure within the conduit 38 to overcome the biasing force of the spring 406 pressing the ball 402 against the valve seat 404. For example, the bypass valve 400 may be designed such that a relatively low pressure, such as about 1 bar, is sufficient to lift the ball 402 from the valve seat 404 against the biasing force from the spring 406. As will be explained in detail below, this relatively low pressure bypass still permits a desirable manual push-through maneuver if needed while also helping to prevent catastrophic leakage from the reservoir 20 in case of a failure in the front circuit associated with the front wheel brakes 12a and 12b.

The components of the brake system 10 may be housed within a single unit or housing. However, the reservoir 20 and the master cylinder 14 may be housed separately from the remainder of the brake system 10 contained within their own housing. This is represented by the broken lines 97 of FIG. 1. In this embodiment, only two fluid lines (conduit 38 and 53) need to interconnect these two housings of the brake system 10. Compared to a conventional brake system using a tandem master cylinder requiring three fluid lines, the use of only two fluid lines in the brake system 10 reduces costs and complexity of installation of the brake system 10. Another advantage of using the single chamber master cylinder 14 compared to a conventional tandem master cylinder is the reduced length, packaging size, and weight of the master cylinder 14.

The operation of the brake system 10 will now be described. During a typical or normal braking operation, the brake pedal 70 is depressed by the driver of the vehicle. In a preferred embodiment of the brake system 10, the master cylinder 14 includes one or more travel sensors 174 and 176 (for redundancy) for producing signals transmitted to the ECU 22 that are indicative of the length of travel of the piston 84 of the master cylinder 14.

During normal braking operations, the plunger assembly 18 is operated to provide pressure to the conduit 34 for actuation of the wheel brakes 12a, 12b, 12c, and 12d. Under certain driving conditions, the ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the master cylinder 14, generated by depression of the brake pedal 70, is diverted into the pedal simulator 16. The simulator valve 180 is actuated to its open position to divert fluid through the simulator valve 180 from the chamber 94 of the master cylinder 14. Note that fluid flow from the chamber 94 to the reservoir 20 is closed off once the passageway 104 in the piston 84 moves past the seal 100. During the duration of a normal braking event, the simulator valve 180 remains open, preferably. Also during the normal braking operation, the isolation valve 30 is energized to a secondary position to prevent the flow of fluid from the conduit 36 through the isolation valve 30. Preferably, the isolation valve 30 is energized throughout the duration of an ignition cycle such as when the engine is running instead of being energized on and off to help minimize noise. It is generally desirable to maintain the isolation valve 30 energized during the normal braking mode to ensure venting of fluid to the reservoir 20 through the plunger assembly 18 such as during a release of the brake pedal 70 by the driver. It is noted that fluid flow and pressure from the conduit 34 is free to flow into the conduit 42 and pressurized the wheel brakes 12c and 12d through the open apply valves 58 and 62.

During normal braking operations, while the pedal simulator 16 is being actuated by depression of the brake pedal 70, the plunger assembly 18 can be actuated by the ECU 22 to provide actuation of the wheel brakes 12a, 12b, 12c, and 12d. The plunger assembly 18 is operated to provide desired pressure levels to the wheel brakes 12a, 12b, 12c, and 12d compared to the travel and pressure generated by the master cylinder 14 by the driver depressing the brake pedal 70. The electronic control unit 22 actuates the motor 314 to rotate the rotor 317 and the screw shaft 316 in the first rotational direction. Rotation of the screw shaft 316 in the first rotational direction causes the piston 306 to advance in the forward direction (rightward as viewing FIGS. 1 and 2). Movement of the piston 306 causes a pressure increase in the first pressure chamber 340 and fluid to flow out of the first pressure chamber 340 and into the conduit 254. Fluid can flow into the conduit 34 through plunger valve 380. Note that fluid is permitted to flow into the second pressure chamber 342 via the conduits 34 and 42 as the piston 306 advances in the forward direction. Pressurized fluid from the conduit 34 is directed into the conduit 42 and into the conduit 40 through the isolation valve 30. The pressurized fluid from the conduits 40 and 42 can be directed to the wheel brakes 12a, 12b, 12c, and 12d through open apply valves 50, 54, 58, and 62.

During this normal braking event, the normally closed dump valves 52 and 56 associated with the front brakes remain de-energized and closed. However, during this normal braking event, the normally open dump valves 60 and 64 are energized to their closed positions. Although the brake system 10 could be configured such that the rear dump valves 60 and 64 are normally closed valves and are operated similarly to the front dump valves 52 and 56, there are advantages to the brake system 10 shown in FIG. 1. One of these advantages is that upon an electrical power failure, there is a possibility that the plunger assembly 18 could hydraulically lock up due to the plunger valve 380 closing, which could cause the three-way isolation valve 30 to lock up even when de-energized such that it operates as it is in an energized state. This can be caused by the interaction of the structural features of the valve construction of the isolation valve 30 during shut down and not necessarily illustrated and apparent in the schematic illustration of the isolation valve 30. Thus, having normally open rear dump valves 60 and 64 may help in relieving pressure by venting pressure from the rear brakes 12c and 12d and the plunger assembly 18 to the reservoir 20 during an electrical failure.

Another advantage in having normally open rear dump valves 60 and 64 is to perform a desired smooth brake blending between the front and rear brake circuits associated with the front and rear wheel brakes. For example, it may be desirable to alter the pressures between the front and rear circuits due, such as for regenerative braking purposes. Brake blending can be accomplished with the ECU 22 by cycling the rear apply valves 58 and 62 and the rear dump valves 60 and 64 to vent pressure to the reservoir conduit 53 to produce a desired braking force on the rear brake circuit different from the braking force on the front brake circuit. Due to structural characteristics of valve construction, this brake blending can be easier to maintain and smoother to control with normally open dump valves 60 and 64 versus normally closed valves. Although one or more normally closed proportional control valves may be incorporated into the brake system 10 to achieve the desired control and smoothness, this type of valve add cost, weight, and complexity to the brake system.

When the driver lifts off or releases the brake pedal 70, the ECU 22 can operate the motor 314 to rotate the screw shaft 316 in the second rotational direction causing the piston 306 to retract withdrawing the fluid from the wheel brakes 12*a*, 12*b*, 12*c*, and 12*d*. The speed and distance of the retraction of the piston 306 is based on the demands of the driver releasing the brake pedal 70. Of course, if the driver rapidly releases the brake pedal 70, the plunger assembly 18 may be operated to avoid such an instant drop in pressure.

In some situations, the piston 306 of the plunger assembly 18 may reach its full stroke length within the bore 300 of the housing and additional boosted pressure is still desired to be delivered to the wheel brakes 12*a*, 12*b*, 12*c*, and 12*d*. The plunger assembly 18 is a dual acting plunger assembly such that it is configured to also provide boosted pressure to the conduit 34 when the piston 306 is stroked rearwardly (leftward) or in a reverse direction. This has the advantage over a conventional plunger assembly that first requires its piston to be brought backward before it can again advance the piston to create pressure within a single pressure chamber. If the piston 306 has reached its full stroke, for example, and additional boosted pressure is still desired, the plunger valve 380 is operated to its closed check valve position, as shown in FIG. 1. The electronic control unit 22 actuates the motor 314 in a second rotational direction opposite the first rotational direction to rotate the screw shaft 316 in the second rotational direction. Rotation of the screw shaft 316 in the second rotational direction causes the piston 306 to retract or move in the rearward direction (leftward as viewing FIGS. 1 and 2). Movement of the piston 306 causes a pressure increase in the second pressure chamber 342 and fluid to flow out of the second pressure chamber 342 and into the conduit 34. Pressurized fluid from the conduit 34 is directed into the conduits 40 and 42. The pressurized fluid from the conduits 40 and 42 can be directed to the wheel brakes 12*a*, 12*b*, 12*c*, and 12*d* through the opened apply valves 50, 54, 58, and 62 while the front dump valves 52 and 56 remain closed and the rear dump valves 60 and 64 are energized to their closed positions. Note that the check valve 384 of the plunger valve 380 prevents pressurized fluid from flowing from the conduit 42 into the first pressure chamber 340 of the plunger assembly 18.

In a similar manner as during a forward stroke of the piston 306, the ECU 22 can also selectively actuate the apply valves 50, 54, 58, and 62 and the dump valves 52, 56, 60, and 64 to provide a desired pressure level to the wheel brakes 12*a*, 12*b*, 12*c*, and 12*d*, respectively. When the driver lifts off or releases the brake pedal 70 during a pressurized rearward stroke of the plunger assembly 18, the plunger valve 380 is preferably operated to its open position.

During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the ECU 22 can operate the plunger assembly 18 to provide a source of pressurized fluid directed to the wheel brakes, such as during an autonomous vehicle braking event.

In the event of a loss of electrical power to portions of the brake system 10, the brake system 10 provides for manual push through or manual apply such that the master cylinder 14 can supply relatively high pressure fluid to the conduits 36 and 40. It is preferred that the brake system 10 is configured such that manual push-through is available on the front wheel brakes 12*a* and 12*b* versus the rear brakes 12*c* and 12*d* as the nature of decelerating a four wheeled vehicle generally demands a greater braking force on the front wheel brakes for better deceleration of the vehicle while also maintaining vehicle stability. During an electrical failure, the motor 314 of the plunger assembly 18 might cease to operate, thereby failing to produce pressurized hydraulic brake fluid from the plunger assembly 18. The isolation valve 30 will shuttle (or remain) in its de-energized position to permit fluid flow from the conduit 36 to the wheel brakes 12*a* and 12*b*. The simulator valve 180 is shuttled (or remains) to its closed position to prevent fluid from flowing out of the chamber 94 of the master cylinder 14 to the pedal simulator 16. During the manual push-through apply, the piston 84 will advance leftwardly such that the passageway 104 will move past the seal 100 to prevent fluid flow from its fluid chamber 94 to the reservoir 20, thereby pressurizing the chamber 94. Fluid flows from the chamber 94 into the conduit 38, 36 and 40 to actuate the front wheel brakes 12*a* and 12*b*. Note that the rear wheel brakes 12*c* and 12*d* are not actuated during a manual push-through event in the brake system 10. The single chamber master cylinder 14 is preferably configured to generate a sufficiently high pressure since manual push-through is only available on the front wheel brakes.

As discussed above, the bypass valve 400, at its relatively low opening or cracking pressure of about 1 bar, will easily be overcome by the pressure generated by the master cylinder 14 to open to permit the manual push-through maneuver. An advantage of the inclusion of the bypass vale 400 is to prevent catastrophic fluid leakage during certain failed conditions. For example, if there was a fluid leak at the left front wheel brake 12*b*, such as for example, the conduit 51 was torn or was disconnected, fluid could potentially leak out of the broken conduit 51 even if the vehicle were not operating if the brake system 10 did not include the bypass valve 400. Specifically, fluid could leak from the reservoir 20, through the master cylinder 14, through the conduit 38, through the open simulator test valve 186, through the conduit 36, through the de-energized isolation valve 30, through the conduit 40, through the open de-energized apply valve 54, and out through the broken conduit 51. Of course, the potential of fluid leakage from a broken conduit would depend on various factors such as the surface tension of the fluid and the diameter of the conduit 51. However, the 1 bar pressure required to open the bypass valve 400 would prevent fluid from flowing past the valve seat 404 since the reservoir fluid pressure is substantially lower than 1 bar, thereby preventing the possible draining of the reservoir 20. Note that the separator wall 20*a* of the reservoir would prevent total fluid loss of the reservoir 20 but could permit all fluid from that side of the reservoir 20 corresponding to the conduit 106. Note that fluid pressure from the reservoir 20 would generally never be greater than 1 bar pressure. In this broken conduit 51 failed condition, the bypass valve 400 prevents air from being introduced into the brake system 10 during every start up of the brake system 10. For example, if air was present around the isolation valve 30 due to fluid pouring out and being replaced by air, upon start up of the plunger assembly 18 this air would be directed to the wheel brake 12*a* due the fluid pressure increase in the conduit 34. Every engine cycle and/or plunger assembly 18 start up could potentially introduce more and more air into the system.

If there was a fluid leak at the left front wheel brake 12*b*, for example, the brake system 10 could be configured to detect such as leak and then the ECU 22 can energize the corresponding apply valve 54 to its closed position to prevent further fluid from exiting the brake system 10 via the broken conduit 51. If desired, the brake system 10 can continuously energize the apply valve 54 and provide audible and visual warnings alerting the driver to this severe failure. Thus, the plunger assembly 18 could still be operated to supply pressurized fluid to the other three wheel brakes 12a, 12c, and 12d even though the wheel brake 12b is inoperable.

Figure 3:
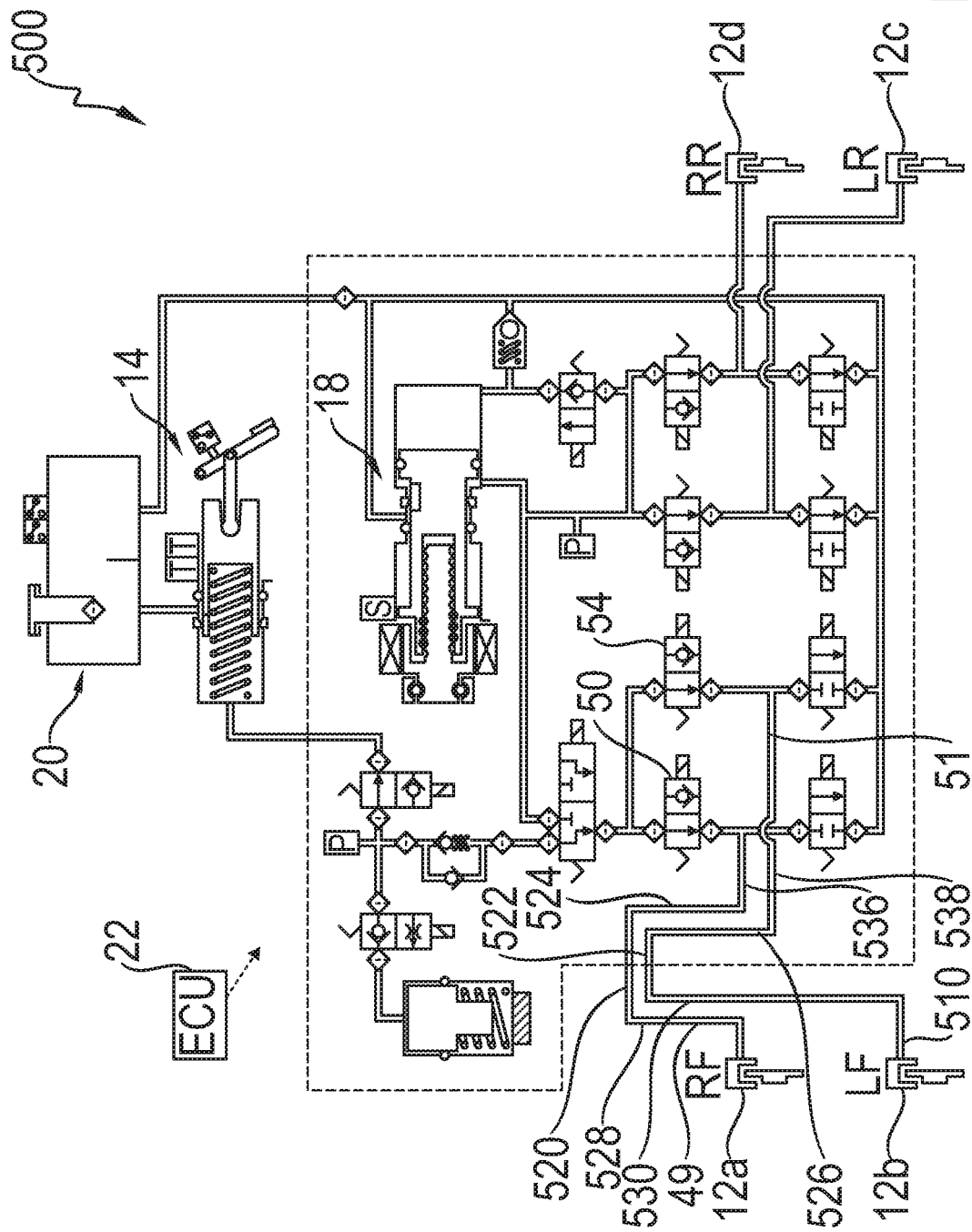
FIG. 3 is a schematic illustration of a second embodiment of a brake system.

There is illustrated in FIG. 3 a schematic illustration of a second embodiment of a brake system, indicated generally at 500. The brake system 500 is similar to the brake system 10 of FIG. 1 and, therefore, like functions and structures may not be described in duplicate. Similar structures of the brake systems 10 and 500 may share the same reference numbers as described above with respect to the brake system 10 of FIG. 1.

The main difference between the brake systems 10 and 500 is that the brake system 500 includes a more specific piping configuration for the conduits 49 and 51. As described above with respect to an example of a broken line or conduit 51, there is illustrated in FIG. 3 such a break of the conduit 51 at reference number 510. The potential leakage of the brake system 500 along with the prevention thereof with the inclusion of the bypass valve 400 is the same here for the brake system 500 relative to the situation described above for the brake system 10. To help further fluid losses from the broken conduit 51 (or from a broken conduit 49), the conduits 49 and 51 can be configured with vertical humps or inverted U-shaped upper portions 520 and 522. Instead of being configured such that the conduits 49 and 51 are directed substantially horizontally straight to the respective wheel brakes 12a and 12b, the conduits 49 and 51 would each include a first generally vertical portion 524 and 526, respectively, and a second vertical portion 528 and 530, respectively, such that the upper portions 520 and 522 of the conduits 49 and 51, respectively, are positioned above lower portions 536 and 538, respectively. For fluid to leak out of the conduits 49 and 51, fluid would be directed upwardly against the force of gravity when flowing through the first vertical portions 524 and 526. As an example, if a break 510 did occur in the conduit 51, there is potential that fluid flow from the apply valve 54 would not be directed past the upper portion 522 of the conduit 51. Of course, various factors such as pressure, fluid viscosity, fluid surface tension, and the internal diameter of the conduit 51 all would influence the stoppage of the fluid flow at the upper portion 522.

Figure 4:
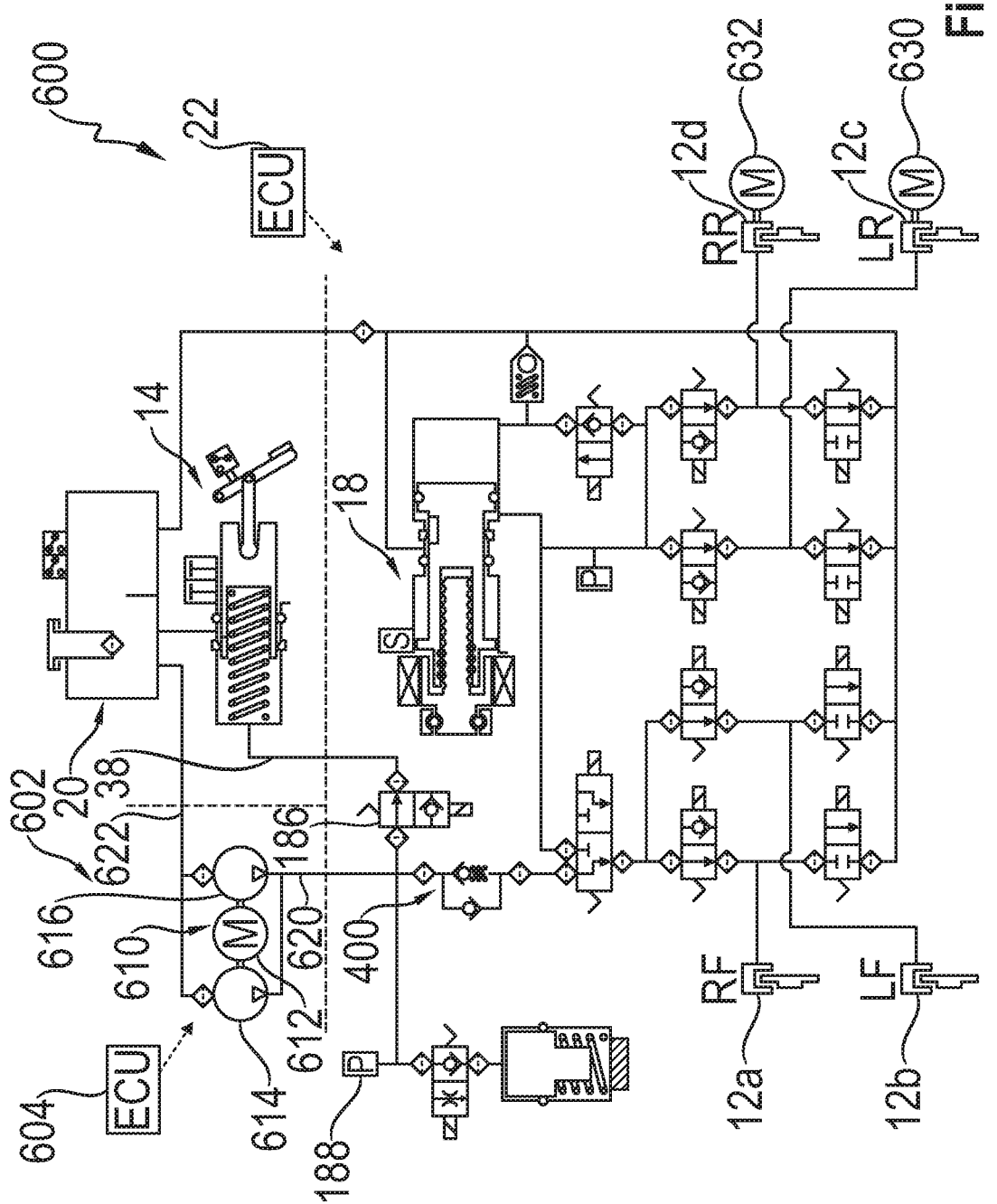
FIG. 4 is a schematic illustration of a third embodiment of a brake system.

There is illustrated in FIG. 4 a schematic illustration of a third embodiment of a brake system, indicated generally at 600. The brake system 600 is similar to the brake system 10 of FIG. 1 and, therefore, like functions and structures may not be described in duplicate. Similar structures of the brake systems 10 and 600 may share the same reference numbers as described above with respect to the brake system 10 of FIG. 1.

One of the differences between the brake systems 10 and 600 is that the brake system 600 includes a secondary brake module, indicated generally at 602. The secondary brake module 602 may function as a second source of pressurized fluid, such as for autonomous braking wherein the ECU 22 determines that a braking event should occur regardless of the driver's intent or input. The secondary brake module 602 may also be used under certain failed conditions of the brake system 10, as will be explained below. As a secondary source of pressurized fluid, the secondary brake module 602 provides pressurized fluid which is used to actuate the wheel brakes 12a, 12, 12c, and/or 12d. The secondary brake module 602 may be housed in a different block or unit remotely located from the remainder of the brake system 10, or may be housed integrally therewith or with portions of the brake system 600.

The secondary brake module 602 may further include a secondary ECU 604 (separate from the main ECU 22) for controlling the various valves and components of the secondary brake module 602 as well as other components of the brake system 600. The secondary ECU 604 may also be in communication with the ECU 22. In a preferred embodiment, the secondary ECU 604 is also in communication with the pressure sensor 188 and the simulator test valve 186, the reason for which will be explained below.

The main ECU 22 and the secondary ECU 604 may both be connected to a vehicle CAN bus (Controller Area Network bus) for receiving various signals and controls. Both the main ECU 22 and the secondary ECU 604 may send out signals over the CAN bus indicating that they are operating properly. These signals may be received by the other of the ECU 22 and 604. For example, once the secondary ECU 604 does not receive the signal from the main ECU 22 over the CAN bus of proper operation of the main ECU 22, the secondary ECU 604 may begin operating the auxiliary brake module 602, as will be described below.

The secondary brake module 602 further includes a pump assembly, indicated generally at 610. In the embodiment shown, the pump assembly 610 includes a single electric motor 612 controlled by the secondary ECU 604. The pump assembly 610 includes first and second pumps 614 and 616 operated by the motor 612. Of course, the pump assembly 610 can have any suitable configuration other than what is schematically shown in FIG. 4.

The outlet of the pump 614 is directed into a conduit 620 which is in fluid communication with the conduit 38 from the master cylinder 14. The inlet of the pump 614 is in fluid communication with the reservoir 20 via a conduit 622. If the secondary brake module 602 is located remotely from the remainder of the brake system 600, the conduit 622 is preferably a hose or pipe having a sufficiently large diameter to permit the easy flow of fluid therethrough. This relatively large diameter helps to assure that the pump 614 can quickly start pumping a sufficient amount of fluid when first turned on especially during extreme cold temperatures. The outlet of the pump 616 is also directed into the conduit 620. The inlet of the pump 616 is in fluid communication with the reservoir 20 via the conduit 622.

The brake system 600 further includes electrical motorized braking devices 630 and 632 attached to the calipers or other brake devices of the rear wheel brakes 12c and 12d, respectively. The motorized braking devices 630 and 632 are connected to and controlled by the ECU 604 for actuation of the wheel brakes 12c and 12d directly or to other braking features mounted on the respective wheel. For example, the motorized braking devices 630 and 632 may be electrical parking brakes or other supplemental braking devices.

Under normal operating braking procedures, the secondary brake module 602 is not utilized. Although the secondary brake module 602 may be used during various diagnostic procedures, the secondary brake module 602 is generally only used when a failure of brake system 600 is detected such that a normal braking event with the plunger assembly 18 is not able to be performed satisfactorily. Examples of such failures include an electrical power failure or faulty plunger assembly 18 and/or faulty secondary ECU 22. Once a failure is detected, the secondary ECU 604 (or ECU 22) may enter into an autonomous or semi-autonomous event. The secondary ECU 604 can then engage the secondary brake module 602 to start the motor 612 to run the pumps 614 and 616. Upon actuation, fluid flows out of the outlets of the pumps 614 and 616 and into the conduit 620. Pressurized fluid from the conduit 620 flows through the bypass valve 400 and is directed to the front wheel brakes 12a and 12b. If desired, the ECU 604 can control the simulator test valve 186 to selectively place the simulator test valve 186 in its closed position to isolate a higher fluid pressure from the conduit 620 from the output of the master cylinder 14. The secondary ECU 604 receives pressure signals from the pressure sensor 188 and actuates the pump assembly 610 accordingly.

In addition to engaging the secondary brake module 602, the ECU 604 may also simultaneously actuate the motorized braking devices 630 and 632 to further decelerate the vehicle at the rear wheels of the vehicle. Thus, all four wheel brakes 12a, 12b, 12c, and 12d may be actuated even upon a failure of the main braking devices of the brake system 600 such as the plunger assembly 18 and/or the main ECU 22.

Alternatively, the secondary brake module 602 may be engaged by the ECU 604 when the brake system 600 has not entered into a manual push-through event such that fluid can be introduced into the conduit 620 even if the driver is not pressing on the brake pedal 70. For example, the secondary brake module 602 may be engaged by the ECU 604 or ECU 22 to enter into an autonomous braking event.

Figure 5:
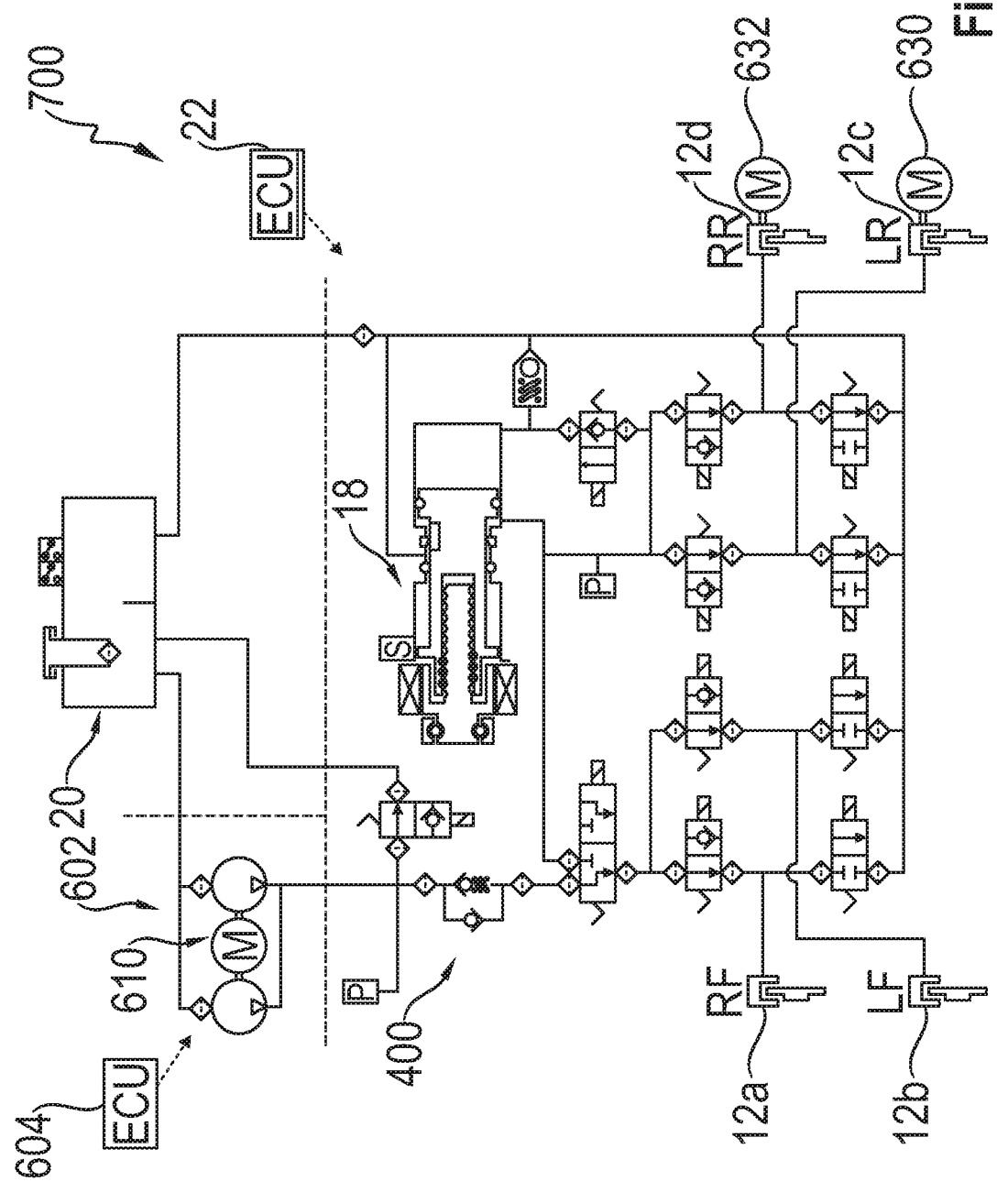
FIG. 5 is a schematic illustration of a fourth embodiment of a brake system.

There is illustrated in FIG. 5 a schematic illustration of a fourth embodiment of a brake system, indicated generally at 700. The brake system 700 is similar to the brake systems 10 and 600 and, therefore, like functions and structures may not be described in duplicate. Similar structures of the brake systems 10, 600, and 700 may share the same reference numbers as described above with respect to the brake systems 10 and 600.

The brake system 700 is configured for a fully autonomous brake system such that no hydraulic input is received from a human driver of the vehicle. The ECU 22 and/or the secondary ECU 604 fully control the brake system 700. Due to the lack of direct human driver input, many components can be eliminated from the brake system 700 compared to the brake systems 10 and 600. Examples of components which can be eliminated include the master cylinder, the brake pedal and its corresponding structures, the pedal travel sensors, the pedal simulator, and the pedal simulator valve.

It should be noted that the brake system 700 could be configured to receive information from a driver such as with a brake-by-wire system. In this configuration, signals generated from a joystick or electrically operated pedals may send information to the ECU 604 based on the driver's or user's demands. The ECU 604 can process this information and actuate the brake system 700 accordingly.

The brake system functions similar to the brake systems 10 and 600 described above. During normal braking, the ECU 22 controls the plunger assembly 18 to provide pressurized fluid to the wheel brakes 12a, 12b, 12c, and 12d. During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, and regenerative braking events by general operation of the plunger assembly 18 in conjunction with the apply valves and the dump valves. Although the brake system 700 does not have a manual push-through mode due to the lack of pressure generated from a master cylinder, the ECU 22 or 604 can actuate the secondary brake module 602 in a similar manner as described above with respect to the brake system 600 to function as a second source of pressurized fluid. The secondary brake module 602, controlled by the secondary ECU 604, may pressurize fluid which is directed to the front wheel brakes 12a and 12b in the event of a failure in the primary brake system (plunger assembly 18). Preferably, the secondary brake module 602 and the ECU 604 are connected to a power source independently from the power source associated with the remainder of the brake system 700. Thus, if power is shut off from the brake system 700, the secondary brake module 602 and the ECU 604 can still function and operate to decelerate the vehicle. Additionally, the brake system 700 preferably includes the bypass valve 400 to help prevent fluid leakage from the reservoir 20 in case of a failure in the front circuit associated with the front wheel brakes 12a and 12b, as described above with respect to the brake system 10.

Figure 6:
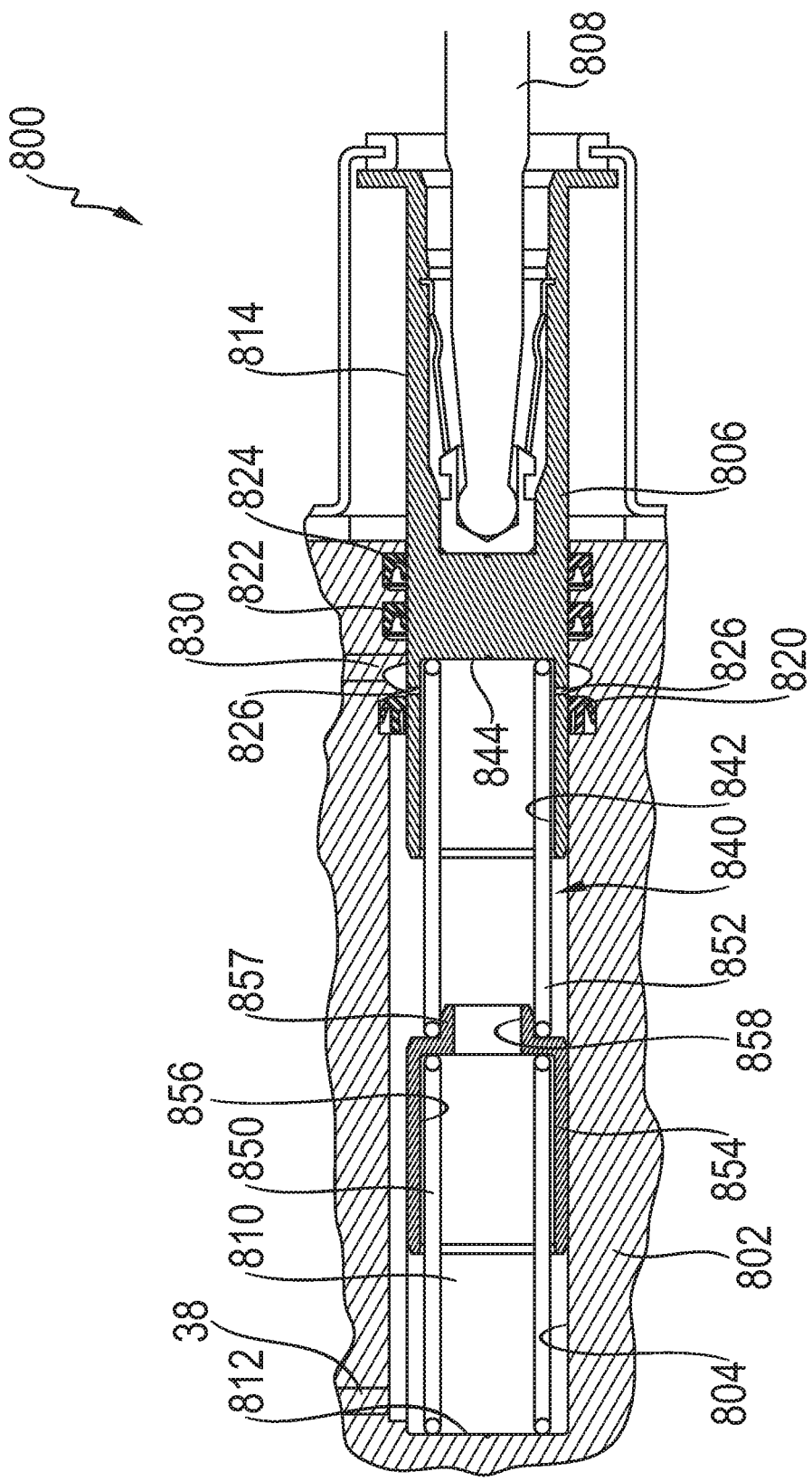
FIG. 6 is a schematic cross-sectional illustration of a single chamber master cylinder which may be used for the various brake systems described herein.

Referring now to FIG. 6, there is illustrated a master cylinder 800 which may be used as the master cylinder 14 for any of the brake systems described above. The master cylinder 800 is of a single chamber design having a single pressure chamber and outlet port. As will be explained below, the master cylinder 800 includes features to help prevent spring buckling or bending as compared to other conventional single chamber master cylinders that have a single elongated coil spring therein.

As shown in FIG. 6, the master cylinder 14 includes a housing 802 having a bore 804 formed therein for slidably receiving a cylindrical piston 806 slidably disposed within the bore 804. The housing 802 may be formed as a single unit or include two or more separately formed portions coupled together. The piston 806 is connected with the brake pedal 70 via a linkage arm 808. Leftward movement of the piston 806 may cause, under certain conditions, a pressure increase within a pressure chamber 810 of the master cylinder 800. Various seals of the master cylinder 800 as well as the structure of the housing 802 and the piston 806 define the pressure chamber 810. For example, the pressure chamber 810 is generally defined between the piston 806 and an end wall 812 of the bore 804.

An outer wall 814 of the piston 806 is engaged with a recuperating or lip seal 820 and a pair of seals 822 and 824 mounted in grooves formed in the housing 802. One or more lateral passageways 826 are formed through a wall of the piston 806. The passageway 826 is located between the lip seal 820 and the seal 822 when the piston 806 is in its rest position, as shown in FIG. 6. Note that in the rest position the lip seal 820 is just slightly to the left of the passageway 826, thereby permitting fluid communication between the chamber 810 and the reservoir 20 via a conduit 830. When the passageway 826 moves past the lip seal 820 such that it is to the left of the lip seal 820, fluid communication is cut off between the chamber 810 and the reservoir 20. Therefore, the cooperation between the passageway 826, the lip seal 820, and the conduit 830 function as a compensation port selectively permitting fluid communication between the chamber 810 and the reservoir 20.

The master cylinder 800 includes a spring assembly, indicated generally at 840. The spring assembly 840 is partially disposed within a bore 842 formed in the piston 806. The spring assembly 840 extends from a bottom 844 of the bore 842 of the piston 806 and the end wall 812 of the bore 804 of the housing 802 of the master cylinder 800. The spring assembly 840 biases the piston 806 in a direction towards the brake pedal 70, rightward as viewing FIG. 6. The spring assembly 840 preferably includes first and second coil springs, shown schematically at 850 and 852, with a spring stabilizer or retainer 854 disposed therebetween. The spring assembly 840 is designed to help prevent buckling or bending of the spring arrangement mounted in the master cylinder compared to a generally elongate conventional single coil spring.

The coil springs 850 and 852 may be identical in structure, as shown in FIG. 6. However, the coil springs 850 and 852 may instead be shaped differently, have different lengths, and/or have different spring rates. The retainer 854 may be made of any suitable material, such as plastic. The retainer 854 has a cup shape body defining a bore 856 formed therein. The retainer 854 may include a reduced diameter portion 857 extending longitudinally outward opposite the bore 856 for retaining one end of the coil spring 852. The other end of the coil spring 852 is housed within the bore 842 of the piston 806. The coil spring 850 is partially retained or housed in the bore 856 of the retainer 854. The reduced diameter portion 857 preferably includes a hole 858 formed therein for ease of fluid passage. By breaking the spring assembly 840 into two or more springs, the chance of buckling or bending of the springs during compression thereof is greatly reduced. Additionally, the retainer 854 may be designed such that it slides smoothly within the bore 804 of the housing 802 with reduced wobble. Since a single chamber master cylinder generally requires a relatively long travel length of its piston to accommodate high pressure forces, the length of the spring assembly is also generally necessarily long in length.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake system having a wheel brake comprising:
a fluid reservoir, the pressure within the fluid reservoir being below 1 bar;
a valve assembly in fluid communication with the reservoir via a first conduit, and wherein the valve assembly is in fluid communication with the wheel brake via a second conduit, wherein the valve assembly includes:
a bypass valve having an open condition permitting fluid flow from the first conduit to the second conduit in response to the fluid pressure within the first conduit reaching 1 bar and having a closed condition when the fluid pressure within the first conduit is below 1 bar; and
a check valve in a parallel path arrangement relative to the bypass valve such that the check valve permits fluid flow from the second conduit to the first conduit, and prevents fluid flow from the first conduit to the second conduit,
wherein both the bypass valve and the check valve are normally closed; and
a first source of pressurized fluid providing fluid pressure for actuating the wheel brake, wherein the first source of pressurized fluid is selectively in fluid communication with the second conduit.

2. The system of claim 1 further including a master cylinder operable by a brake pedal, wherein the master cylinder is selectively in fluid communication with the first conduit.

3. The system of claim 2, wherein the master cylinder has a single fluid pressure chamber pressurized by movement of a single piston slidably disposed in a bore of a housing of the master cylinder, and wherein the single fluid pressure chamber is selectively in fluid communication with the first conduit.

4. The system of claim 1, wherein the brake system is operable under a non-failure normal braking mode and a manual push-through mode, the system further including:
a master cylinder operable by a brake pedal during the manual push-through mode to provide fluid flow at the first conduit for actuating the wheel brake; and
wherein the first source of pressurized fluid provides fluid pressure in the second conduit for actuating the wheel brake under the normal braking mode.

5. The system of claim 4, wherein the first source of pressurized fluid is a plunger assembly including a housing defining a bore therein, wherein the plunger assembly includes a piston slidably disposed in the bore of the plunger assembly such that movement of the piston pressurizes a pressure chamber when the piston is moved in a first direction, and wherein the pressure chamber of the plunger assembly is in fluid communication with the second conduit, and wherein the plunger assembly further includes an electrically operated linear actuator for moving the piston within the bore.

6. The system of claim 4 further including a second source of pressurized fluid for generating brake actuating pressure for actuating the wheel brake, wherein the second source of pressurized fluid is in fluid communication with the first conduit.

7. The system of claim 6, wherein the second source of pressurized fluid includes a motorized pump.

8. The system of claim 1, wherein the bypass valve comprises a check valve.

9. A brake system having a wheel brake comprising:
a fluid reservoir, the pressure within the fluid reservoir being below 1 bar;
a valve assembly in fluid communication with the reservoir via a first conduit, and wherein the valve assembly is in fluid communication with the wheel brake via a second conduit, wherein the valve assembly is free of an electromagnetic valve and includes:
a bypass valve having an open condition permitting fluid flow from the first conduit to the second conduit in response to the fluid pressure within the first conduit reaching 1 bar and having a closed condition when the fluid pressure within the first conduit is below 1 bar; and
a check valve in a parallel path arrangement relative to the bypass valve such that the check valve permits fluid flow from the second conduit to the first conduit, and prevents fluid flow from the first conduit to the second conduit; and
a first source of pressurized fluid providing fluid pressure for actuating the wheel brake, wherein the first source of pressurized fluid is selectively in fluid communication with the second conduit.

10. The system of claim 9 further including a master cylinder operable by a brake pedal, wherein the master cylinder is selectively in fluid communication with the first conduit.

11. The system of claim 10, wherein the master cylinder has a single fluid pressure chamber pressurized by movement of a single piston slidably disposed in a bore of a housing of the master cylinder, and wherein the single fluid pressure chamber is selectively in fluid communication with the first conduit.

12. The system of claim 9, wherein the brake system is operable under a non-failure normal braking mode and a manual push-through mode, the system further including:
 a master cylinder operable by a brake pedal during the manual push-through mode to provide fluid flow at the first conduit for actuating the wheel brake; and
 wherein the first source of pressurized fluid provides fluid pressure in the second conduit for actuating the wheel brake under the normal braking mode.

13. The system of claim 12, wherein the first source of pressurized fluid is a plunger assembly including a housing defining a bore therein, wherein the plunger assembly includes a piston slidably disposed in the bore of the plunger assembly such that movement of the piston pressurizes a pressure chamber when the piston is moved in a first direction, and wherein the pressure chamber of the plunger assembly is in fluid communication with the second conduit, and wherein the plunger assembly further includes an electrically operated linear actuator for moving the piston within the bore.

14. The system of claim 12 further including a second source of pressurized fluid for generating brake actuating pressure for actuating the wheel brake, wherein the second source of pressurized fluid is in fluid communication with the first conduit.

15. The system of claim 14, wherein the second source of pressurized fluid includes a motorized pump.

16. The system of claim 9, wherein the bypass valve comprises a check valve.

\* \* \* \* \*